United States Patent
Morioka et al.

(10) Patent No.: US 12,283,668 B2
(45) Date of Patent: Apr. 22, 2025

(54) VOLTAGE DETECTION UNIT AND POWER STORAGE DEVICE

(71) Applicants: YAZAKI CORPORATION, Tokyo (JP); TOYOTA JIDOSHA KABUSHIKI KAISHA, Toyota (JP); KABUSHIKI KAISHA TOYOTA JIDOSHOKKI, Kariya (JP)

(72) Inventors: Satoshi Morioka, Okazaki (JP); Motoyoshi Okumura, Nagoya (JP); Hiromi Ueda, Kariya (JP); Naoto Morisaku, Kariya (JP); Yutaro Okazaki, Kakegawa (JP); Shinichi Yanagihara, Kakegawa (JP)

(73) Assignees: YAZAKI CORPORATION, Tokyo (JP); TOYOTA JIDOSHA KABUSHIKI KAISHA, Toyota (JP); KABUSHIKI KAISHA TOYOTA JIDOSHOKKI, Kariya (JP)

( * ) Notice: Subject to any disclaimer, the term of this patent is extended or adjusted under 35 U.S.C. 154(b) by 540 days.

(21) Appl. No.: 17/731,929

(22) Filed: Apr. 28, 2022

(65) Prior Publication Data
US 2022/0352567 A1 Nov. 3, 2022

(51) Int. Cl.
*H01M 50/262* (2021.01)
*H01M 10/48* (2006.01)
*H01M 50/271* (2021.01)

(52) U.S. Cl.
CPC ......... *H01M 10/48* (2013.01); *H01M 50/262* (2021.01); *H01M 50/271* (2021.01)

(58) Field of Classification Search
CPC .. H01M 10/48; H01M 50/262; H01M 50/271; H01M 50/209; H01M 50/211; H01M 50/569; H01M 10/482; H01M 50/258; Y02E 60/10
See application file for complete search history.

(56) References Cited

U.S. PATENT DOCUMENTS

2021/0126475 A1* 4/2021 Preisig ................. H02J 7/0042

FOREIGN PATENT DOCUMENTS

JP 2020-161340 A 10/2020

OTHER PUBLICATIONS

English machine translation of JP2013080618A description.*

* cited by examiner

*Primary Examiner* — Matthew T Martin
*Assistant Examiner* — Felicity Bernard Alban
(74) *Attorney, Agent, or Firm* — Sughrue Mion, PLLC (57) ABSTRACT

A voltage detection unit includes a voltage detection terminal, a housing having an accommodating concave portion to accommodate the voltage detection terminal and a cover to be attached to the housing while covering the accommodating concave portion. The cover is locked to the housing at a temporary locking position at which the cover covers a part of the accommodating concave portion and at a final locking position at which the cover covers an entirety of the accommodating concave portion. The cover includes a main body portion including a locking portion, and a locking piece. The housing includes a locked portion to be locked to the locking portion, a locking hole to accommodate the locking piece and an extending portion formed by a part of an edge of the locking hole. The locking piece is accommodated in the locking hole when the cover is at the temporary locking position.

4 Claims, 9 Drawing Sheets

UPPER

LEFT · FRONT

REAR · RIGHT

LOWER

UPPER ↑ LOWER ↓  LEFT ← → RIGHT

VOLTAGE DETECTION UNIT AND POWER STORAGE DEVICE

CROSS-REFERENCE TO RELATED APPLICATION

The present application claims priority to Japanese Patent Application No. 2021-078143 filed on Apr. 30, 2021, the entire content of which is incorporated herein by reference.

TECHNICAL FIELD

The presently disclosed subject matter relates to a voltage detection unit configured such that a voltage detection terminal to be conductively connected to a detection target is accommodated in a plate shaped housing, and a power storage device including the voltage detection unit.

BACKGROUND

In related art, there has been proposed a stacked power storage device in which a plurality of power storage modules are connected in series via conductive plates by alternately arranging and repeatedly stacking the thin plate-shaped power storage modules each capable of charging and discharging and the conductive plates. The power storage module used in this type of power storage device generally has a structure in which a plurality of battery cells are built therein, and functions as one battery that is capable of charging and discharging. In one of the power storage devices in the related art, in order to monitor an output state of each power storage module (that is, a potential of an output surface of each power storage module with respect to a reference zero potential, hereinafter, also simply referred to as a "voltage of the power storage module"), a detection terminal such as a bus bar is connected to a conductive plate in contact with the output surface of each power storage module, and a voltage of each power storage module is measured via the detection terminal (for example, see JP2020-161340A).

When the bus bar or the like is actually connected to the conductive plate in the power storage device having the above-described structure, it is difficult to secure a space for providing other components for connection (for example, bolts for bolt fastening) since the power storage module or the conductive plate has the thin plate shape. Therefore, in the power storage device described above in the related art, an insertion hole through which the detection terminal is inserted is provided in a side edge portion of the conductive plate, and the detection terminal is inserted into the insertion hole of each conductive plate from a side of a stacked body in which the power storage module and the conductive plate are stacked, thereby connecting the conductive plate and the detection terminal. However, in the connection method in the related art, when the detection terminal is inserted, since position alignment between the insertion hole of the conductive plate and the detection terminal is complicated, it is difficult to improve workability of the connection operation.

SUMMARY

Illustrative aspects of the presently disclosed subject matter provide a voltage detection unit excellent in workability of conductive connection with a detection target, and a power storage device.

According to an illustrative aspect of the presently disclosed subject matter, a voltage detection unit includes a voltage detection terminal having a plate-shape and having a connection portion configured to be electrically connected to a detection target, a housing having a plate shape and having an accommodating concave portion configured to accommodate the voltage detection terminal and a cover configured to be attached to the housing by being moved from a first side toward a second side along a first direction and to cover the accommodating concave portion. The cover is configured to be locked to the housing at a temporary locking position at which the cover covers only a part of the accommodating concave portion such that the connection portion is exposed and at a final locking position at which the cover covers an entirety of the accommodating concave portion. The cover includes a main body portion configured to, when the cover is at the final locking position, cover the accommodating concave portion and including a locking portion provided on a third side in a second direction being perpendicular to the first direction and being a longitudinal direction of the voltage detection unit, and a locking piece provided on a fourth side opposite to the third side along the second direction and extending from the main body portion toward the second side along the first direction. The housing includes a locked portion provided on the third side and configured to be locked to the locking portion; a locking hole provided on the fourth side and configured to accommodate the locking piece and an extending portion formed by a part of an edge of the locking hole, the part extending toward the first side along the first direction. A distal end of the locking piece on the second side is accommodated in the locking hole when the cover is at the temporary locking position.

Other aspects and advantages of the presently disclosed subject matter will be apparent from the following description, the drawings and the claims.

DESCRIPTION OF EMBODIMENTS

Figure 1:
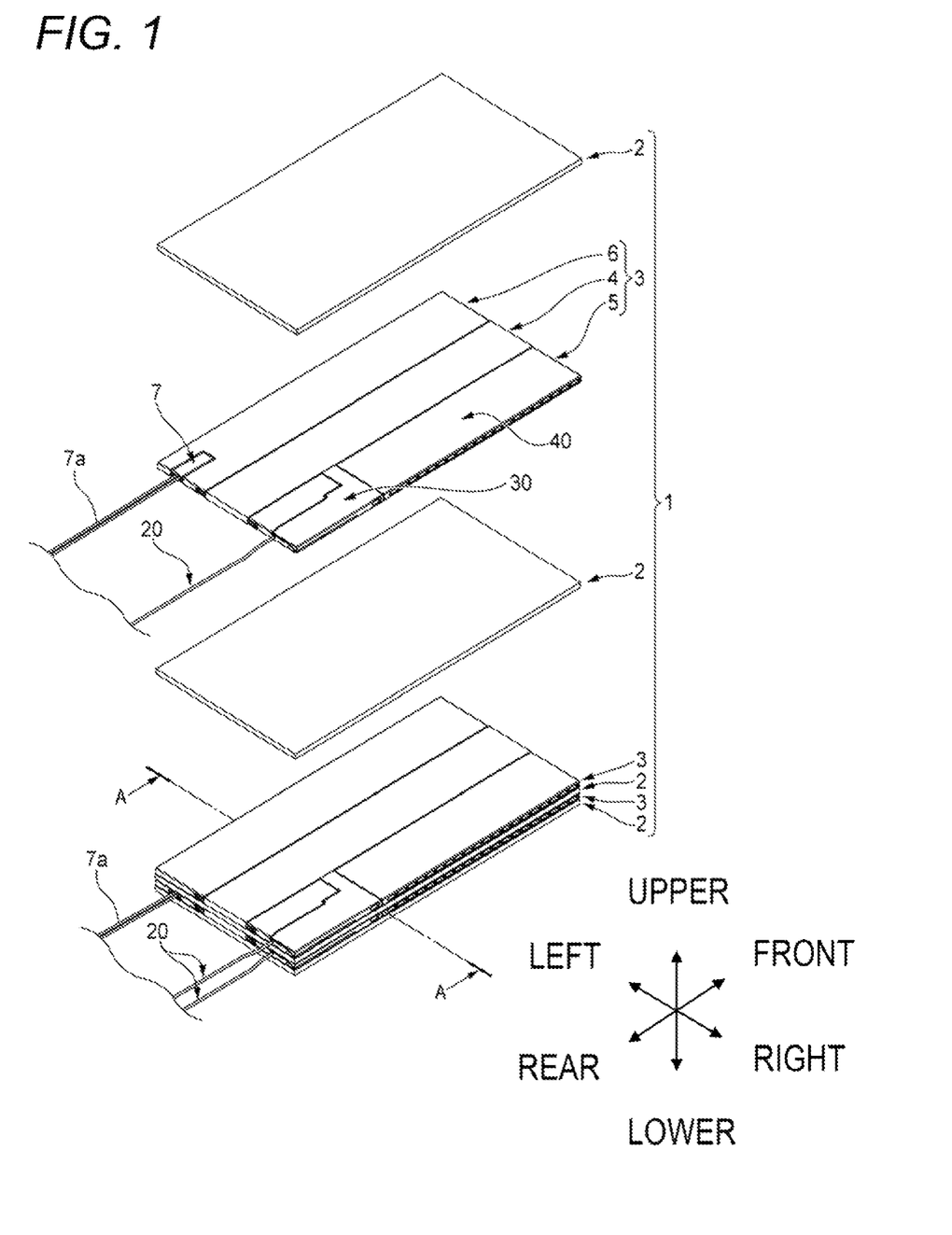
FIG. 1 is a partially exploded perspective view of a stacked power storage device including a voltage detection unit according to an embodiment of the presently disclosed subject matter.

Hereinafter, a voltage detection unit 5 according to an embodiment of the presently disclosed subject matter will be described with reference to the drawings. Hereinafter, for convenience of description, a "front-rear direction", a "left-right direction", an "upper-lower direction", "front", "rear", "le" "right", "upper", and "lower" are defined as shown in FIG. 1 and the like. The "front-rear direction", the "left-right direction", and the "upper-lower direction" are perpendicular to one another. The left-right direction may be described as a first direction in which a cover is attached to a housing. The front-rear direction may be described as a second direction. The right side may be described as a first side and the left side may be described as a second side. The front side may be described as a third side and the rear side may be described as a fourth side.

A voltage detection unit 5 is typically used in a stacked power storage device 1, such as the one shown in FIG. 1. The power storage device 1 is formed by alternately stacking, in the upper-lower direction, rectangular thin plate-shaped power storage modules 2 that are capable of charging and discharging, and rectangular thin plate-shaped conductive modules 3 that can electrically connect adjacent power storage modules 2 to each other. In the power storage device 1, a plurality of power storage modules 2 are electrically connected to each other in series via the conductive modules 3. The power storage module 2 has a structure in which a plurality of battery cells (not shown) are built in, and the power storage module 2 as a whole functions as one battery that is capable of charging and discharging.

Figure 2A:
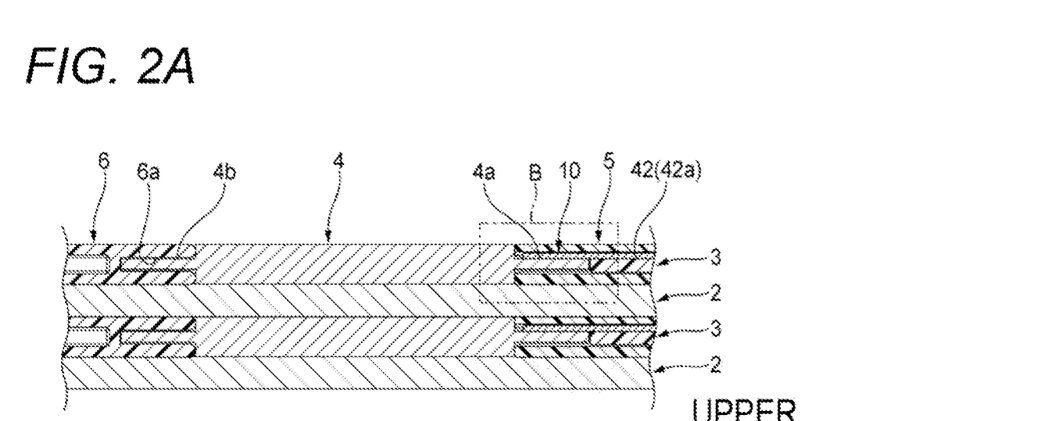
FIG. 2A is a cross-sectional view taken along a line A-A of FIG. 1.
Figure 3:
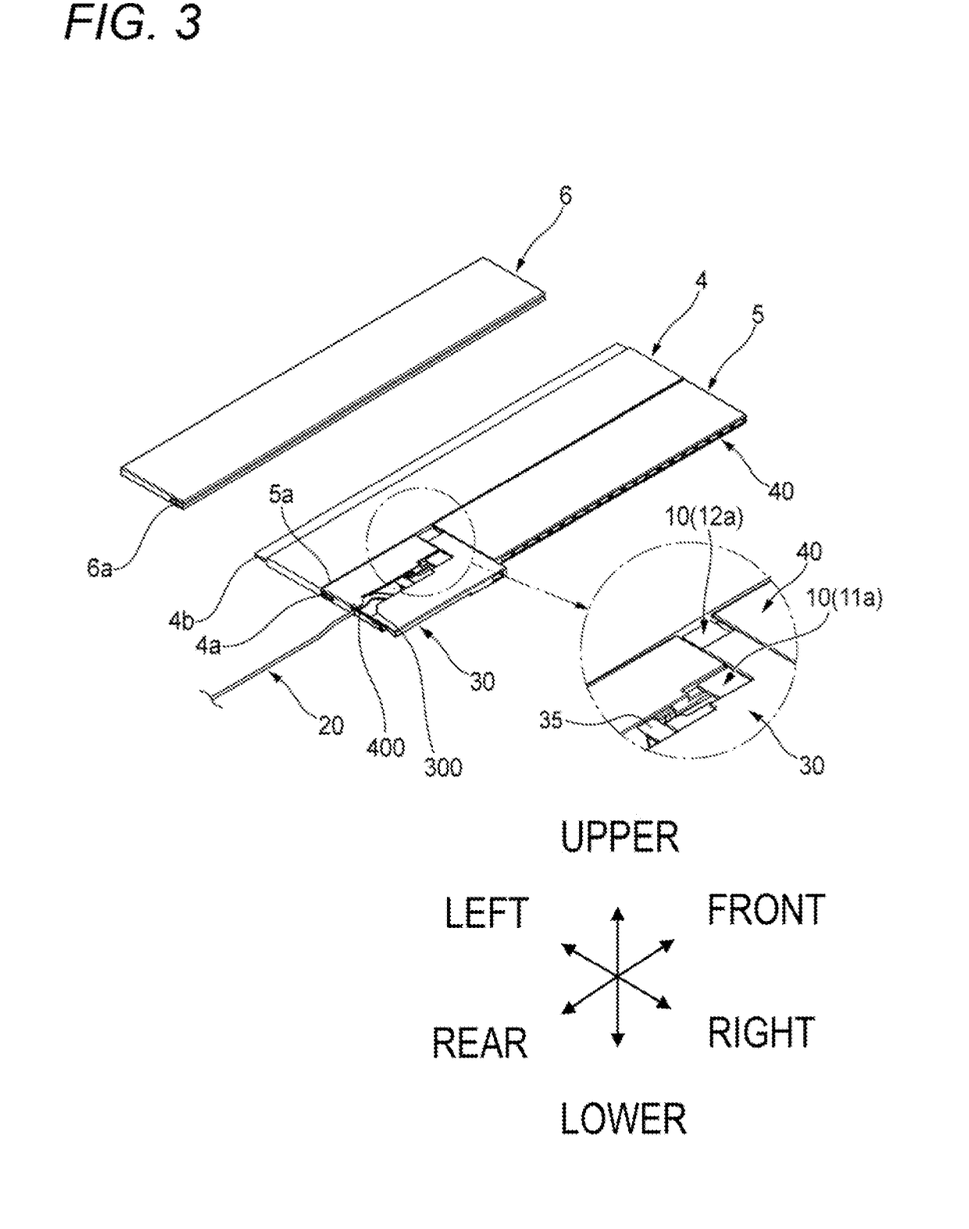
FIG. 3 is a partially exploded perspective view of a conductive module shown in FIG. 1.

As shown in FIG. 1, the conductive module 3 includes a conductive plate 4 having a rectangular thin plate shape (the conductive plate 4 also has a function as a heat sink as described later), a voltage detection unit 5 having a rectangular thin plate shape connected to a right side of the conductive plate 4, and a opposite unit 6 having a rectangular thin plate shape connected to a left side of the conductive plate 4, and is formed to have a rectangular thin plate shape as a whole. As shown in FIGS. 1 to 3 (particularly, see FIG. 2A), the conductive plate 4 and the voltage detection unit 5 are connected to each other by fitting a flange portion 4a provided on a right end surface of the conductive plate 4 and extending in the front-rear direction into a concave portion 5a provided on a left end surface of the voltage detection unit and extending in the front-rear direction. The conductive plate 4 and the opposite unit 6 are connected to each other by fitting a flange portion 4b provided on a left end surface of the conductive plate 4 and extending in the front-rear direction into a concave portion 6a provided on a right end surface of the opposite unit 6 and extending in the front-rear direction.

In each of the conductive modules 3 located between the adjacent power storage modules 2 in the upper-lower direction, the conductive plate 4 is in direct contact with the upper and lower power storage modules 2 as shown in FIG. 2A. Therefore, the conductive plate 4 has a function of electrically connecting a lower surface of the upper power storage module 2 and an upper surface of the lower power storage module 2 to each other, and a function, as a heat sink, of releasing heat generated from the upper and lower power storage modules 2 to the outside.

In each of the conductive modules 3 located between the adjacent power storage modules 2 in the upper-lower direction, the voltage detection unit 5 includes a voltage detection terminal 10 (see FIGS. 2A and 2B and the like), which will be described later, to be in contact with the conductive plate 4. The voltage detection unit 5 has a function of outputting a signal indicating a voltage between the upper and lower power storage modules 2 (specifically, a potential of the upper surface (output surface) of the lower power storage module 2 with respect to a reference zero potential) via an electric wire 20 (see FIG. 1 and the like) connected to the voltage detection terminal 10. Although the voltage detection unit 5 is disposed on a right side of the conductive plate 4 in FIGS. 1 to 3, a voltage detection unit having the same function as the voltage detection unit 5 may be disposed on a left side of the conductive plate 4. In this case, as the voltage detection unit having the same function as the voltage detection unit 5, a voltage detection unit (that is, a symmetric product of the voltage detection unit 5) obtained by reversing the entire configuration of the voltage detection unit 5 in the left-right direction is used.

In each of the conductive modules 3 located between the adjacent power storage modules 2 in the upper-lower direction, as the opposite unit 6, any one of a voltage detection unit, a dummy unit, or a temperature detection unit is used in accordance with the specification of the power storage device 1.

When the opposite unit 6 is a voltage detection unit, the voltage detection unit (that is, the symmetric product of the voltage detection unit 5 described above) obtained by reversing the entire structure of the voltage detection unit 5 in the left-right direction is used as the opposite unit 6. In this case, the voltage detection unit 5 is disposed on the right side of the conductive plate 4, and the symmetric product of the voltage detection unit 5 is disposed on the left side of the conductive plate 4. The opposite unit 6 (the symmetric product of the voltage detection unit 5) has the same function as the voltage detection unit 5.

When the opposite unit 6 is a dummy unit, as shown in FIG. 3, a simple resin plate having the concave portion 6a extending in the front-rear direction is used as the opposite unit 6. In this case, the opposite unit 6 only has a function of filling a gap between the upper and lower power storage modules 2.

When the opposite unit 6 is a temperature detection unit, as shown in FIG. 1, the opposite unit 6 has a structure in which a temperature sensor 7 (thermistor) is incorporated in the resin plate used as the dummy unit. In this case, the opposite unit 6 has a function of outputting a signal indicating temperatures of the upper and lower power storage modules 2 via an electric wire 7a (see FIG. 1) connected to the temperature sensor 7.

Figure 4:
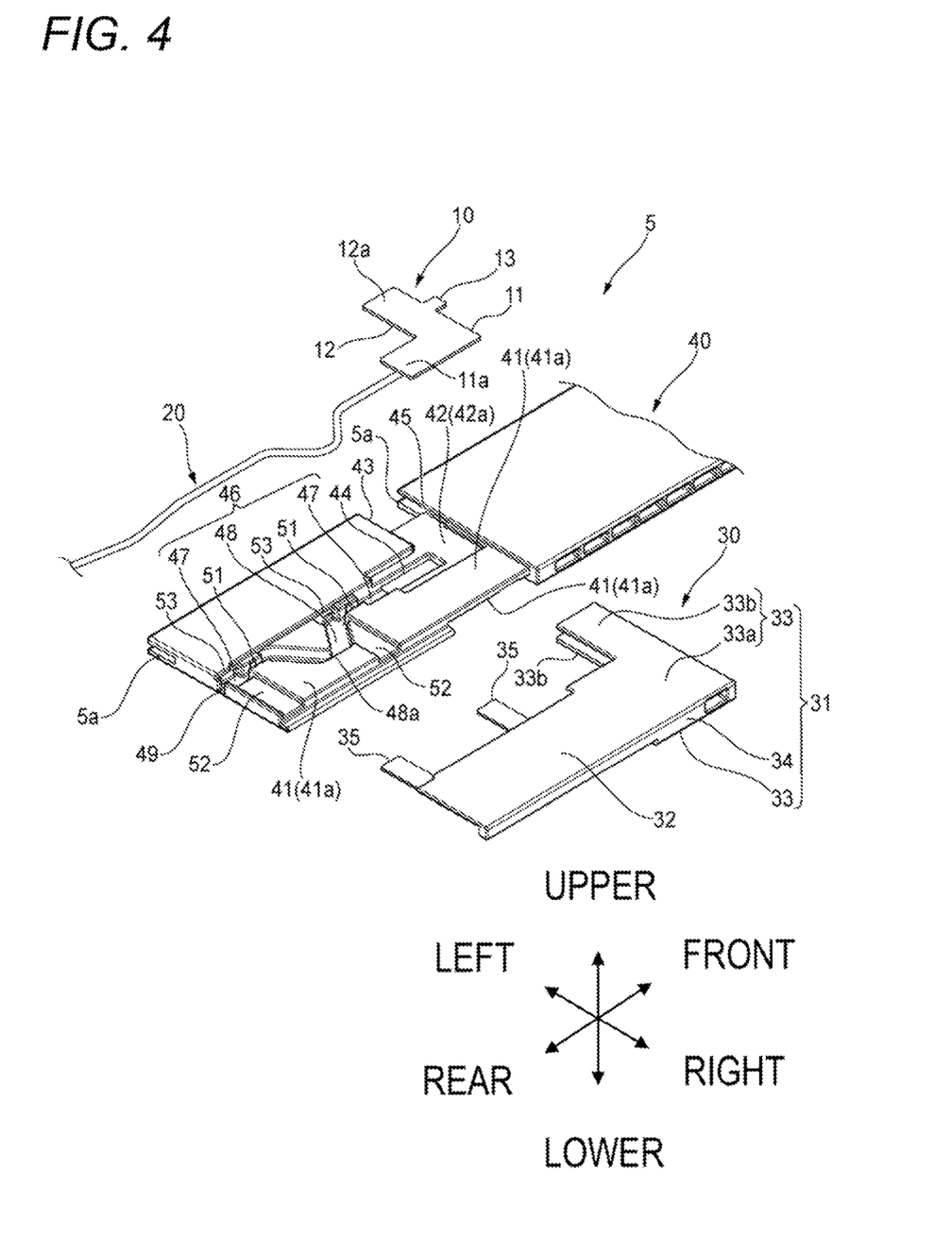
FIG. 4 is an exploded perspective view of the voltage detection unit according to the embodiment of the presently disclosed subject matter shown in FIG. 1.
Figure 5A:
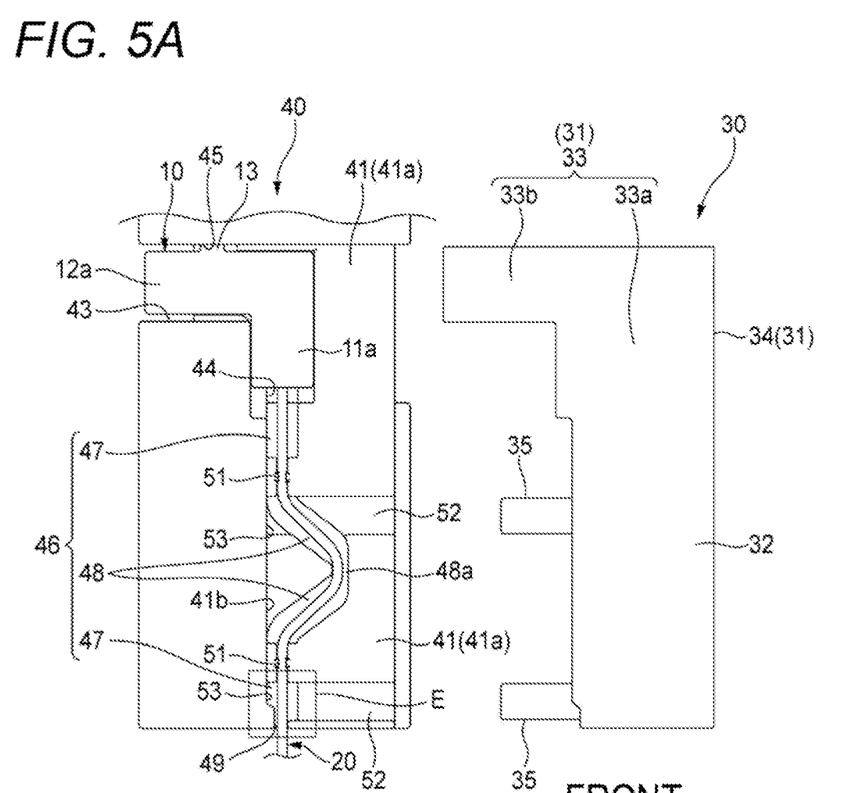
FIG. 5A is a top view showing a housing in which a voltage detection terminal and an electric wire are accommodated and a cover.
Figure 5B:
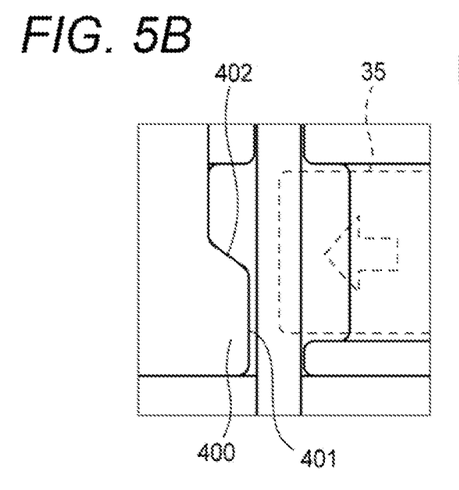
FIG. 5B is an enlarged view of a portion E in FIG. 5A.

Hereinafter, a specific configuration of the voltage detection unit 5 according to the embodiment of the presently disclosed subject matter will be described with reference to FIGS. 4 to 8B. As shown in FIG. 4, the voltage detection unit 5 includes a housing 40, the voltage detection terminal 10 accommodated in the housing 40, the electric wire 20 connected to the voltage detection terminal 10 and accommodated in the housing 40, and a cover 30 attached to the housing 40.

The voltage detection terminal 10 is accommodated in a terminal accommodating concave 42 (see FIG. 4), which will be described later, formed in the housing 40, the electric wire 20 is accommodated in an electric wire accommodating concave 46 (see FIG. 4), which will be described later, formed in the housing 40, and the cover 30 is attached to cover attaching concaves 41 (see FIG. 4), which will be described later, formed in the housing 40. Hereinafter, each member forming the voltage detection unit 5 will be described in order.

First, the voltage detection terminal 10 will be described. The voltage detection terminal 10 made of metal is formed by performing processing such as press processing on one metal plate. The voltage detection terminal 10 is accommodated in the terminal accommodating concave 42 of the housing 40 from above. As shown in FIG. 4, the voltage detection terminal 10 includes a first portion 11 having a rectangular flat plate shape extending in the front-rear direction and a second portion 12 having a rectangular flat plate shape extending leftward from a front-end portion of the first portion 11, and has a flat plate shape which is a substantially L-shape as a whole when viewed in the upper-lower direction.

Figure 6:
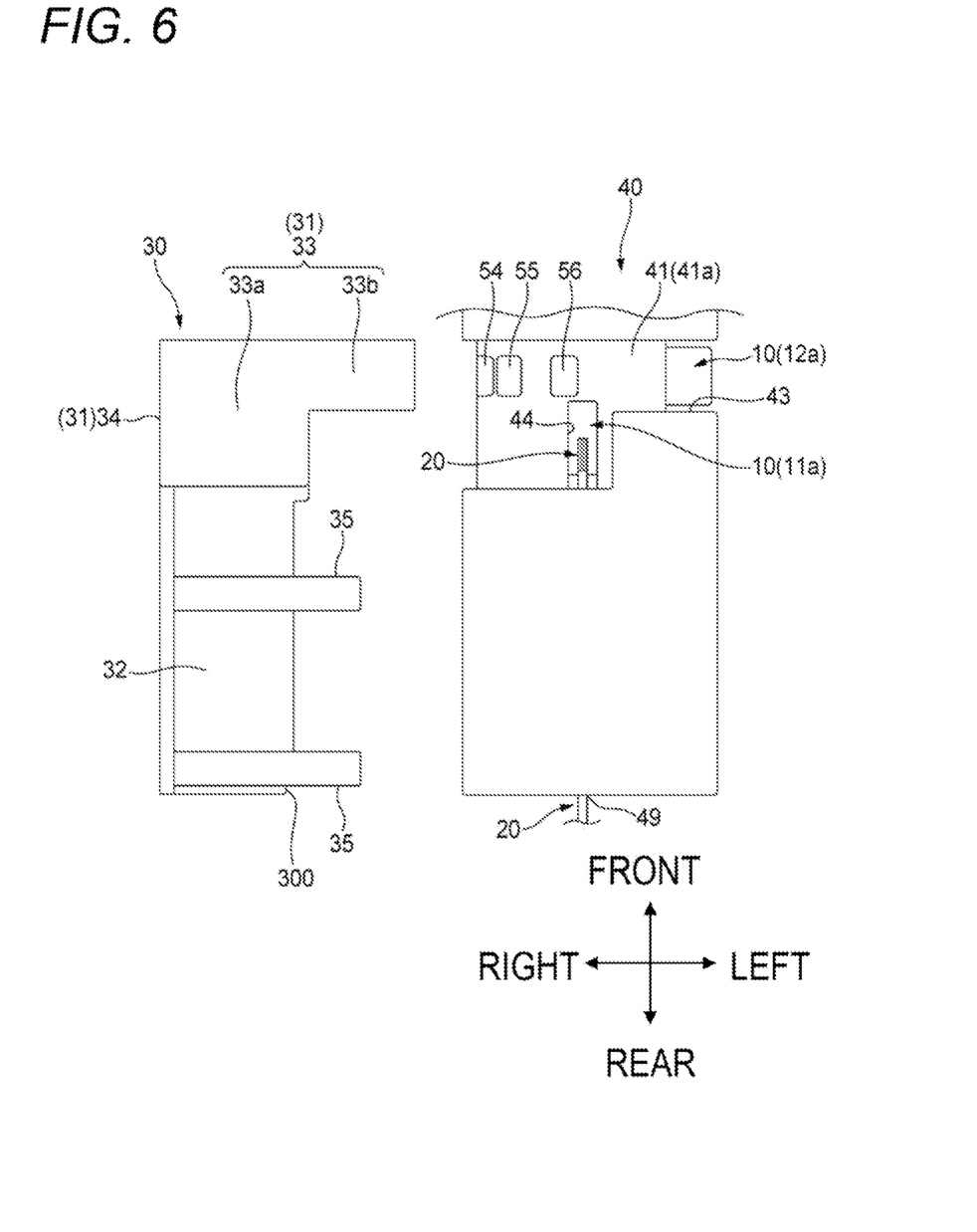
FIG. 6 is a bottom view showing the housing in which the voltage detection terminal and the electric wire are accommodated and the cover.

One end portion of the electric wire 20 is fixed to a lower surface of a distal end portion 11a (that is, an end portion on a rear end side) of the first portion 11 so as to be electrically connected thereto (see also FIG. 6). The other end portion of the electric wire 20 is connected to a voltage measuring device (not shown) outside the power storage device 1. A part of the flange portion 4a of the conductive plate 4 is to be fixed to a lower surface of a distal end portion 12a (that is, an end portion on a left end side) of the second portion 12 by a technique such as ultrasonic bonding or welding (see FIG. 2B). In the present embodiment, the distal end portion 12a corresponds to a connection portion, and the conductive plate 4 corresponds to a detection target.

A protruding portion 13 protruding forward is formed at a front-end edge of the second portion 12. When the voltage detection terminal 10 is accommodated in the housing 40, the protruding portion 13 is locked to a locking groove 45 (see FIG. 4) formed in the housing 40.

Next, the cover 30 will be described. The cover 30 is a resin molded product, and is attached to the cover attaching concaves 41 of the housing 40 from the right side. The cover includes an opposing portion 31 and an extending portion 32 extending rearward from the opposing portion 31. The opposing portion 31 mainly functions to cover and protect the voltage detection terminal 10, and the extending portion 32 mainly functions to cover and protect the electric wire 20.

The opposing portion 31 includes a pair of flat plate portions 33 having the same shape and facing each other at an interval in the upper-lower direction, and a connecting portion 34 that connects, in the upper-lower direction, right end edges of the pair of flat plate portions 33 extending in the front-rear direction to each other over the entire area of the right end edges in the front-rear direction. The opposing portion 31 has a substantially U-shape opening leftward when viewed in the front-rear direction. The flat plate portions 33 each includes a substantially square flat plate-shaped base portion 33a connected to the connecting portion 34 and a rectangular flat plate shaped extending portion 33b extending leftward from a front-end portion of the base portion 33a, and has a substantially L shape as a whole when viewed in the upper-lower direction. The extending portion 32 extends rearward continuously from and is flush with a rear end edge of the upper flat plate portion 33 (more specifically, the upper base portion 33a) of the pair of flat plate portions 33 forming the opposing portion 31, and has a substantially rectangular flat plate shape.

In the extending portion 32, a pair of electric wire holding pieces 35 extending in the left-right direction are integrally formed so as to be arranged at an interval in the front-rear direction. As can be understood from FIG. 6, each electric wire holding piece 35 protrudes downward from a lower surface of the extending portion 32, extends in the left-right direction, and further protrudes leftward from a left end edge of the extending portion 32. When the cover 30 is attached to the housing 40, the electric wire holding pieces 35 function to hold the electric wire 20 accommodated in the housing 40. In the present embodiment, out of the pair of electric wire holding pieces 35, the electric wire holding piece 35 disposed in a rear side corresponds to a locking piece.

Figure 7A:
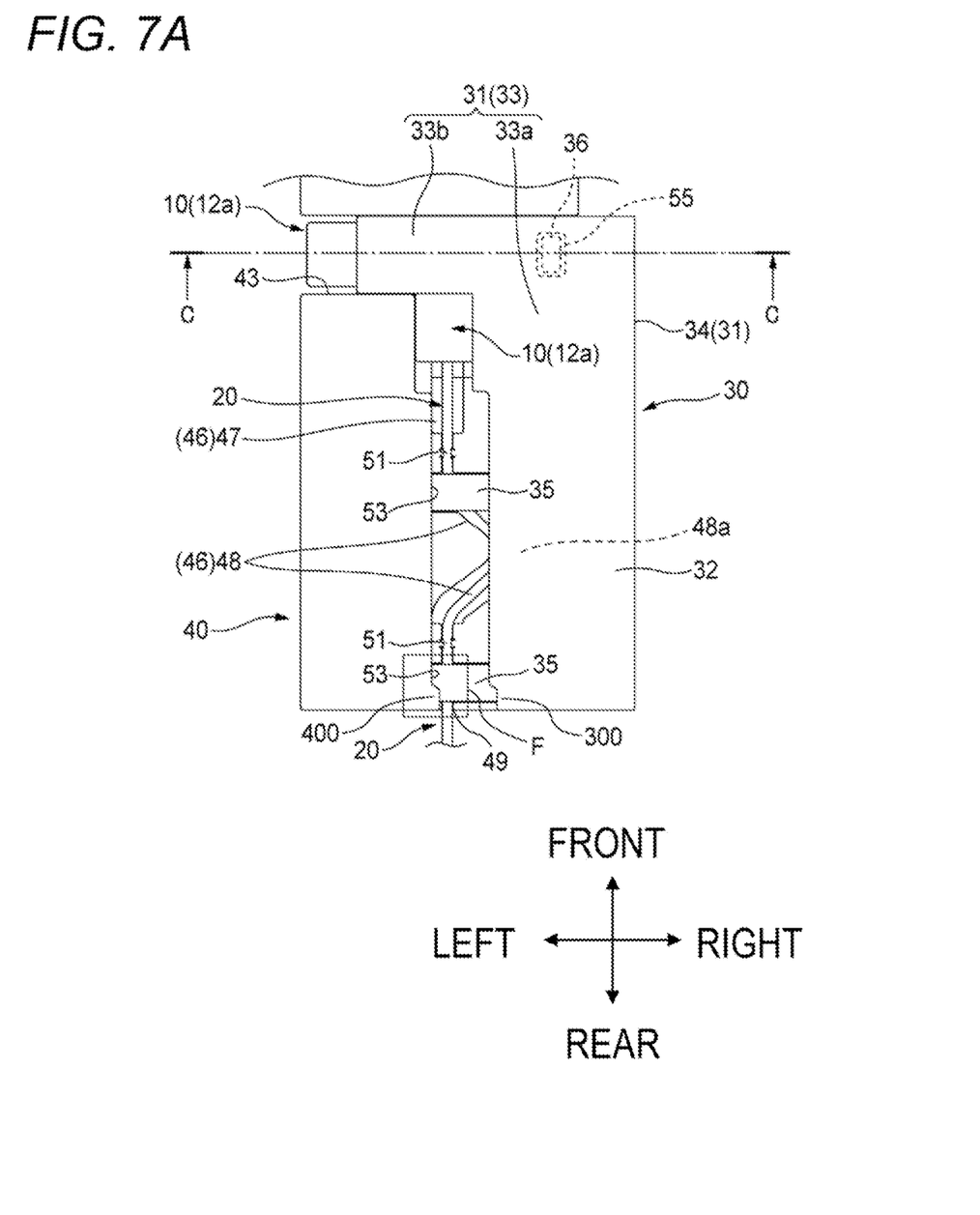
FIG. 7A is a top view showing a state in which the cover is locked to the housing at a temporary locking position.
Figure 8A:
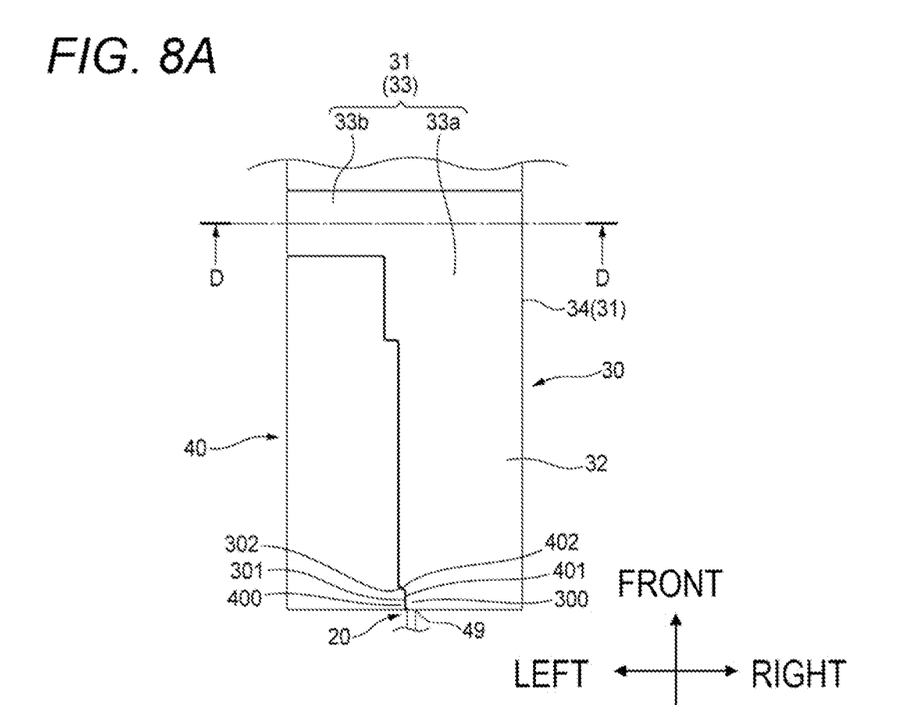
FIG. 8A is a top view showing a state in which the cover is locked to the housing at a final lock position.

The left end of the extending portion 32 on the rear side (the rear side being a position corresponding to the rear electric wire holding piece 35 of the pair of electric wire holding pieces 35) is recessed rightward and the recess is a concave portion 300 (particularly, see FIGS. 7A and 8A). A right end of the concave portion 300 is defined by a concave end portion 301, which is a part of the left end of the extending portion 32 at which the concave portion 300 is provided. An upper end of the concave portion 300 is defined by a concave side surface 302, which is a part of the end of the extending portion 32. A right end of the concave side surface 302 is connected to an upper end of the concave end portion 301. The concave side surface 302 is inclined such that a width of the concave portion 300 in the front-rear direction increases from the concave end portion 301 toward the left side in the left-right direction. In the concave portion 300, the concave end portion 301 has a shape corresponding to an extended end portion 401, which will be described later, of an extending portion 400 of the housing 40, and the concave side surface 302 has a shape corresponding to an extended side surface 402, which will be described later, of the extending portion 400.

Figure 7B:
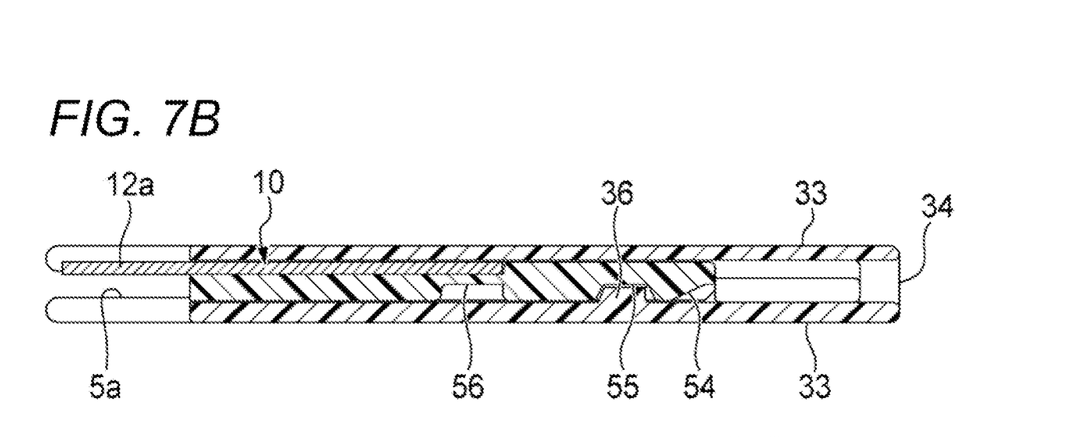
FIG. 7B is a cross-sectional view taken along a line C-C of FIG. 7A.

A locking portion 36 protruding upward toward the upper flat plate portion 33 is formed at a predetermined position of the lower flat plate portion 33 (more specifically, the lower base portion 33a) of the pair of flat plate portions 33 forming the opposing portion 31 (see FIGS. 7B and 8I). The locking portion 36 functions to lock the cover 30 to a temporary locking position (see FIGS. 7A to 7C) and a final locking position (see FIGS. 8A and 8B) in cooperation with a temporary locked portion 55 and a final locked portion 56, which will be described later, provided in the housing 40.

Next, the housing 40 will be described. The housing 40 is a resin molded product, and has a substantially rectangular thin plate shape extending in the front-rear direction, as shown in FIGS. 1, 3, and the like. The concave portion 5a that is concave rightward and extends in the front-rear direction is formed in a left end surface of the housing 40. The flange portion 4a of the conductive plate 4 is to be fitted into the concave portion 5a (see FIGS. 2A and 2B and the like).

The cover attaching concaves 41 each having a shape corresponding to the entire shape of the cover 30 and being concave are formed in portions, to which the cover 30 is to be attached, of upper and lower surfaces of the housing 40 (see FIG. 4). A concave depth (depth in the upper-lower direction) of the cover attaching concave 41 is equal to a plate thickness of the cover 30 (the opposing portion 31+the extending portion 32). Therefore, when the cover is attached to the housing 40, the surfaces of the housing 40 and surfaces of the cover 30 are flush with each other (see FIGS. 1, 8A and 8B).

The terminal accommodating concave 42 having a shape corresponding to the entire shape of the voltage detection terminal 10 and being further concave is formed in a portion, in which the voltage detection terminal 10 is to be accommodated, of the bottom surface 41a of the cover attaching concave 41 on an upper surface side of the housing 40 (see FIG. 4). A concave depth (depth in the upper-lower direction) of the terminal accommodating concave 42 is equal to a plate thickness of the voltage detection terminal 10. Therefore, when the voltage detection terminal 10 is attached to the housing 40, an upper surface of the voltage detection terminal 10 and the bottom surface 41*a* of the cover attaching concave 41 are flush with each other (see FIGS. 7B and 8B).

A notch 43 being concave rightward in a substantially rectangular shape when viewed in the upper-lower direction is formed at a position at a left end edge of the housing 40 in the front-rear direction where the distal end portion 12*a* of the voltage detection terminal 10 is to be disposed. The concave portion 5*a* extending in the front-rear direction on the left end surface of the housing 40 is divided via the notch 43. When the voltage detection terminal 10 is accommodated in the housing 40, upper and lower surfaces of the distal end portion 12*a* of the voltage detection terminal 10 are exposed via the notch 43 (see FIG. 7B).

A through hole 44 extending in the front-rear direction and penetrating in the upper-lower direction is formed in a portion of the terminal accommodating concave 42 where the distal end portion 11*a* of the voltage detection terminal 10 is to be disposed. When the voltage detection terminal 10 is accommodated in the housing 40, the one end portion (contact point) of the electric wire 20 connected to the voltage detection terminal 10 enters the through hole 44 (see FIG. 6). In other words, the through hole 44 functions as a relief portion for avoiding interference between a bottom surface 42*a* of the terminal accommodating concave 42 and the one end portion of the electric wire 20.

The locking groove 45 that is concave forward and communicates with the concave portion 5*a* to correspond to the protruding portion 13 is formed on an inner wall surface of the terminal accommodating concave 42 at a position where the protruding portion 13 (see FIG. 4) of the voltage detection terminal 10 is to be disposed (see FIG. 4).

The electric wire accommodating concave 46 being concave and having a shape corresponding to a routing form of the electric wire 20 when the electric wire 20 is accommodated is formed in a portion of an upper surface of the housing 40 where the electric wire 20 is to be accommodated (see FIG. 4). The electric wire accommodating concave 46 is a series of groove portions including a pair of straight portions 47 that extend in a straight line-shape extending in the front-rear direction and arranged at an interval in the front-rear direction, and a bent portion 48 connecting the pair of straight portions 47 and extending while being bent so as to protrude rightward. A front end of the front straight portion 47 of the pair of straight portions 47 communicates with the terminal accommodating concave 42, and a rear end of the rear straight portion 47 of the pair of straight portions 47 forms an electric wire draw-out opening 49 through which the electric wire 20 extends from a rear end edge of the housing 40. In this manner, since the electric wire accommodating concave 46 includes the bent portion 48, even when an unintended external force is applied to the electric wire 20 drawn out from the housing 40, the external force can be counteracted by friction between the bent portion 48 and the electric wire 20, as compared with a case where the electric wire accommodating concave 46 is formed only of the straight portions 47. Therefore, a large external force is unlikely to be applied to the contact point between the voltage detection terminal 10 and the electric wire 20.

Narrow-width concave portions 51, which are concave portion each having a width (interval in the left-right direction) narrower than that of the straight portion 47, are respectively provided at portions near boundaries between the pair of straight portions 47 and the bent portion 48. The width of the narrow-width concave portion 51 is slightly smaller than an outer diameter of the electric wire 20. Therefore, the narrow-width concave portions 51 function to hold the electric wire 20 while pressing the electric wire 20 in the left-right direction. Since the electric wire 20 is held by the pair of narrow-width concave portions 51, even when an unintended external force is applied to the electric wire 20 drawn out from the housing 40, the external force can be counteracted by friction between the narrow-width concave portions 51 and the electric wire 20. Therefore, a large external force is unlikely to be applied to the contact point between the voltage detection terminal 10 and the electric wire 20.

As shown in FIG. 4, a pair of electric wire holding piece concave portions 52 that extend in the left-right direction and correspond to the pair of electric wire holding pieces 35 are formed in the bottom surface 41*a* of the cover attaching concave 41 on the upper surface side of the housing 40 at positions where the pair of electric wire holding pieces 35 of the cover are to be disposed, so that the pair of electric wire holding piece concave portions 52 are arranged at an interval in the front-rear direction. The pair of electric wire holding piece concave portions 52 are arranged such that an apex 48*a* (see FIG. 4) of the bent portion 48 of the electric wire accommodating concave 46 is disposed between the pair of electric wire holding piece concave portions 52 in the front-rear direction.

Each electric wire holding piece concave portion 52 extends in the left-right direction from a right end edge of the housing 40 on the upper surface of the housing 40 to a left end inner wall 41*b* (see FIG. 4) of the cover attaching concave 41 across the electric wire accommodating concave 46. Accommodating holes 53 being concave leftward are respectively formed in portions, to which the pair of electric wire holding piece concave portions 52 are connected, of the left end inner wall 41*b* of the cover attaching concave 41 (see FIG. 4). When the cover 30 is attached to the housing 40, extended end portions (that is, left end portions) of the pair of electric wire holding pieces 35 of the cover 30 are inserted into and stored in the pair of accommodating holes 53. In the present embodiment, the rear accommodating hole 53 of the pair of accommodating holes 53 corresponds to a locking hole.

The extending portion 400 extends from a part of an edge of the rear accommodating hole 53 (specifically, a right end of an upper wall defining the accommodating hole 53) of the pair of accommodating holes 53 (particularly, see FIGS. 7A and 8A). The extending portion 400 includes the extended end portion 401 being a rightmost end of the extending portion 400, and the extended side surface 402 being an upper end surface of the extending portion 400. The extended side surface 402 is inclined such that a width of the extending portion 400 in the front-rear direction increases from the extended end portion 401 toward the left side in the left-right direction.

As shown in FIG. 6, on the bottom surface 41*a* of the cover attaching concave 41 on a lower surface side of the housing 40, a contact portion 54, the temporary locked portion 55, and the final locked portion 56, which are concave portions being concave upward, are formed in this order so as to be arranged at intervals from right to left at a position in the front-rear direction same as the position where the locking portion 36 (see FIG. 7B and the like) of the cover 30 is disposed. As shown in FIGS. 6 to 8B, the contact portion 54 is a concave portion that is continuous from a right end edge of the housing 40. The members forming the voltage detection unit 5 are described above.

Next, a procedure when the voltage detection terminal 10 and the cover 30 are attached to the housing 40 will be described. First, the voltage detection terminal 10 to which the electric wire 20 is connected in advance by a technique such as the ultrasonic bonding or the welding is accommodated in the terminal accommodating concave 42 of the housing 40. Therefore, the voltage detection terminal 10 is fitted into the terminal accommodating concave 42 of the housing 40 from above such that the protruding portion 13 enters the locking groove and the one end portion (contact point) of the electric wire 20 enters the through hole 44. In a state where the accommodation of the voltage detection terminal 10 in the housing 40 is completed, the upper and lower surfaces of the distal end portion 12a of the voltage detection terminal 10 are exposed via the notch 43 (see FIG. 7B).

Next, the electric wire 20 extending from the voltage detection terminal 10 accommodated in the housing 40 is accommodated in the electric wire accommodating concave 46 of the housing 40. Therefore, the electric wire 20 is fitted from above along the electric wire accommodating concave 46 formed by the pair of straight portions 47 and the bent portion 48. At this time, a pair of portions of the electric wire 20 positioned above the pair of narrow-width concave portions 51 are pushed downward, whereby the pair of portions of the electric wire 20 are accommodated in the pair of narrow-width concave portions 51. In a state where the accommodation of the electric wire 20 in the housing 40 is completed, the electric wire 20 extends rearward from the electric wire draw-out opening 49 to the outside of the housing 40.

Next, the cover 30 is attached to the housing 40. Therefore, the cover 30 is attached to the cover attaching concaves 41 of the housing 40 from the right side such that the opposing portion 31 of the cover 30 vertically sandwiches the cover attaching concaves 41 on the upper and lower surfaces of the housing 40, the extending portion 32 of the cover 30 covers the cover attaching concaves 41 on the upper surface side of the housing 40, and the pair of electric wire holding pieces 35 of the cover 30 covers the pair of electric wire holding piece concave portions 52 of the housing 40.

In the process of attaching the cover 30 to the housing 40, the locking portion 36 of the cover 30 first comes into contact with a left side of an inclined portion of the contact portion 54 of the housing 40, goes over the contact portion 54 while sliding on the left side of the inclined portion of the contact portion 54, and then enters the inside of the temporary locked portion 55, so that the locking portion 36 engages with the temporary locked portion 55, and is pressed against a left side of the inclined portion of the temporary locked portion 55 (see FIG. 7B). As a result, the cover 30 is locked to the housing 40 at the temporary locking position, the attachment of the cover 30 to the housing 40 is completed (see FIGS. 7A to 7C), and the voltage detection unit 5 (see FIG. 3) is obtained. As will be described later, the voltage detection unit 5 obtained after the attachment of the cover 30 to the housing 40 is completed (in the state where the cover 30 is locked at the temporary locking position) is used for assembling the conductive module 3 (see FIG. 1).

In the state where the cover 30 is locked at the temporary locking position, as shown in FIG. 7A, the opposing portion 31 (more specifically, the pair of upper and lower extending portions 33b) of the cover 30 does not cover the distal end portion 12a of the voltage detection terminal 10. Therefore, the upper and lower surfaces of the distal end portion 12a of the voltage detection terminal 10 are still exposed via the notch 43 (see FIG. 7B).

Further, the pair of electric wire holding pieces 35 of the cover 30 are disposed on a part of openings of the straight portion 47 and the bent portion 48 of the electric wire accommodating concave 46. As a result, the electric wire 20 is prevented from coming out of the electric wire accommodating concave 46. Further, the extended end portions of the pair of electric wire holding pieces 35 are inserted in the pair of accommodating holes 53. Accordingly, it is possible to prevent positional deviation of the pair of electric wire holding pieces 35 and unintended deformation such as separation of the pair of electric wire holding pieces 35 from the electric wire accommodating concave 46. Further, the extending portion 32 of the cover 30 is disposed above an opening of the apex 48a of the bent portion 48 of the electric wire accommodating concave 46. Accordingly, it is possible to in a more secure manner prevent the electric wire 20 from coming out of the electric wire accommodating concave 46 and being routed so as to skip the bent portion 48 (that is, to shortcut the bent portion 48). In this manner, it is possible to reduce a possibility that a specific problem occurs due to the electric wire 20 coming out of the bent portion 48 of the electric wire accommodating concave 46.

Figure 7C:
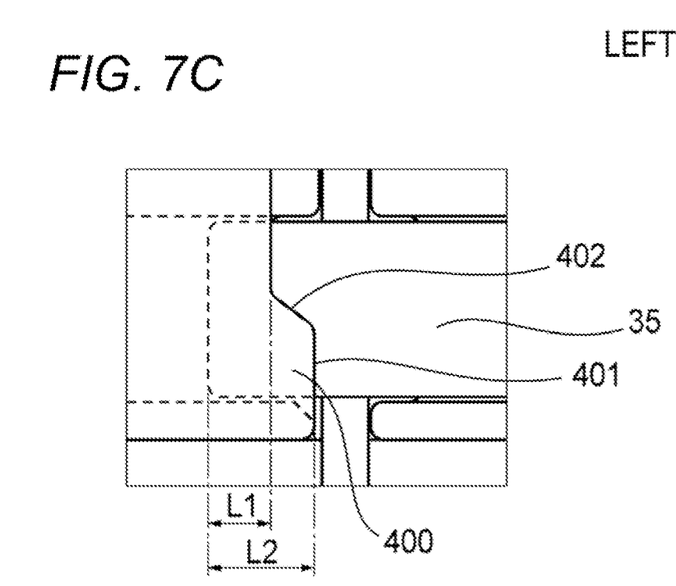
FIG. 7C is an enlarged view of a portion F in FIG. 7A.

Further, the extending portion 400 covers a portion of the electric wire holding piece located on a base end side of the extended end portion of the electric wire holding piece 35 (the portion of the electric wire holding piece 35 located on a right side than the extended end portion of the electric wire holding piece 35) when the electric wire holding piece 35 is inserted into the accommodating hole 53 (see FIG. 7C). That is, in the present embodiment, an engagement margin (see a length L2 in FIG. 7C) between the electric wire holding piece 35 and the accommodating hole 53 is larger than an engagement margin in a case where the extending portion 400 is not provided (see a length L1 in FIG. 7C). In this manner, since the engagement margin between the electric wire holding piece 35 and the accommodating hole 53 is large, displacement of the cover 30 in the upper-lower direction, such that the cover 30 is detached from the housing 40, is prevented, and displacement in a rotational manner, such that the cover is detached from the housing 40 by being rotated with the locking portion 36 as a center of rotation, is also prevented, as compared with the case where the extending portion 400 is not provided in the accommodating hole 53.

Figure 8B:
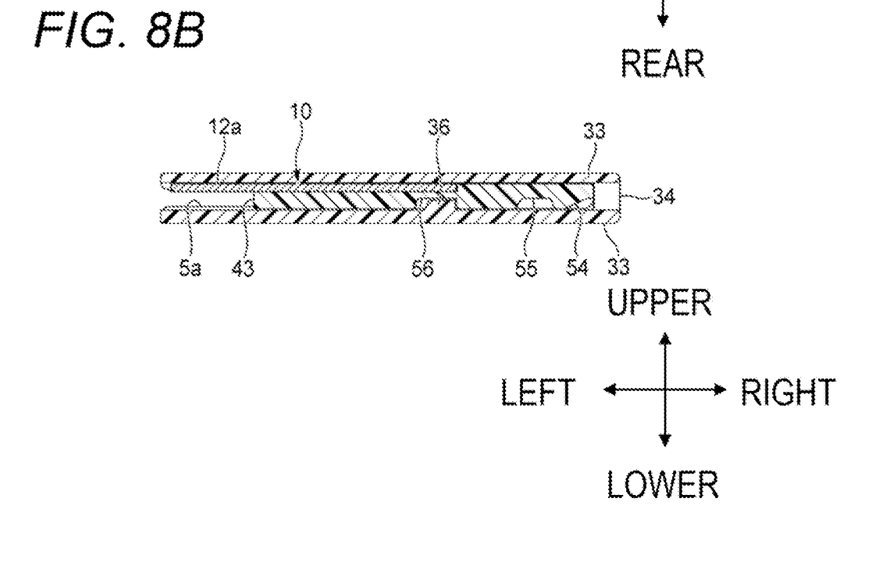
FIG. 8B is a cross-sectional view taken along a line D-D of FIG. 8A.

When the cover 30 is further pushed leftward with respect to the housing 40 in the state where the cover 30 is locked at the temporary locking position, the extended end portions of the pair of electric wire holding pieces 35 of the cover 30 further enter and are stored in the pair of accommodating holes 53, and the locking portion 36 of the cover 30 goes over the temporary locked portion 55, and then enters the inside of the final locked portion 56 to be engaged with the final locked portion 56 (see FIGS. 8A and 8B). As a result, the cover 30 is locked to the housing 40 at the final locking position.

In the state where the cover 30 is locked at the final locking position, the locking portion 36 of the cover 30 cannot easily goes over the final locked portion 56 since right and left side surfaces of the final locked portion 56 are formed of substantially vertical surfaces. As a result, it is possible to prevent a unintended positional deviation, or the like of the cover in the left-right direction.

In the state where the cover 30 is locked at the final locking position, as shown in FIGS. 8A and 8B, an entire region of the cover attaching concave 41 is covered by the cover 30, so that the entire electric wire accommodating concave 46 is covered by the extending portion 32 of the cover 30. As a result, the electric wire 20 is prevented from coming out of the electric wire accommodating concave 46. Further, as shown in FIG. 8A, the opposing portion 31 (more specifically, the pair of upper and lower extending portions 33b) of the cover 30 covers the upper and lower surfaces of the distal end portion 12a of the voltage detection terminal 10. As a result, the entire voltage detection terminal 10 is covered by the opposing portion 31 of the cover 30, and thus, the voltage detection terminal 10 can be reliably protected.

As described above, the voltage detection unit 5 obtained after the attachment of the cover 30 to the housing 40 is completed (in the state where the cover 30 is locked at the temporary locking position) is used for assembling the conductive module 3 (see FIG. 1). Specifically, first, as shown in FIG. 3, the flange portion 4a of the conductive plate 4 and the concave portion 5a of the voltage detection unit 5 are fitted to each other, so that the voltage detection unit 5 is connected to the right side of the conductive plate 4.

In this state, as can be understood from FIGS. 3 and 7B, a part of the flange portion 4a of the conductive plate 4 is disposed so as to overlap a lower side of the distal end portion 12a of the voltage detection terminal 10 (see also FIG. 2B), and since the notch 43 of the housing 40 is present, the upper surface of the distal end portion 12a of the voltage detection terminal 10 is exposed upward, and a part of a lower surface of the flange portion 4a of the conductive plate 4 is exposed downward.

Further, the right end edge of the housing 40 and a left end edge of the cover 30 abut each other without a gap therebetween. More specifically, the extended end portion 401 and the concave end portion 301 abut each other without a gap, and the extended side surface 402 and the concave side surface 302 abut each other without a gap (see FIG. 8A).

Next, by using the upper surface of the distal end portion 12a of the voltage detection terminal 10 exposed upward and the part of the lower surface of the flange portion 4a of the conductive plate 4 exposed downward, the distal end portion 12a of the voltage detection terminal 10 and the part of the flange portion 4a of the conductive plate 4 are fixed to each other by a technique such as the ultrasonic bonding or the welding. Thereafter, the cover 30 is moved from the temporary locking position to the final locking position, and the assembly of the voltage detection unit 5 and the conductive plate 4 is completed.

Figure 2B:
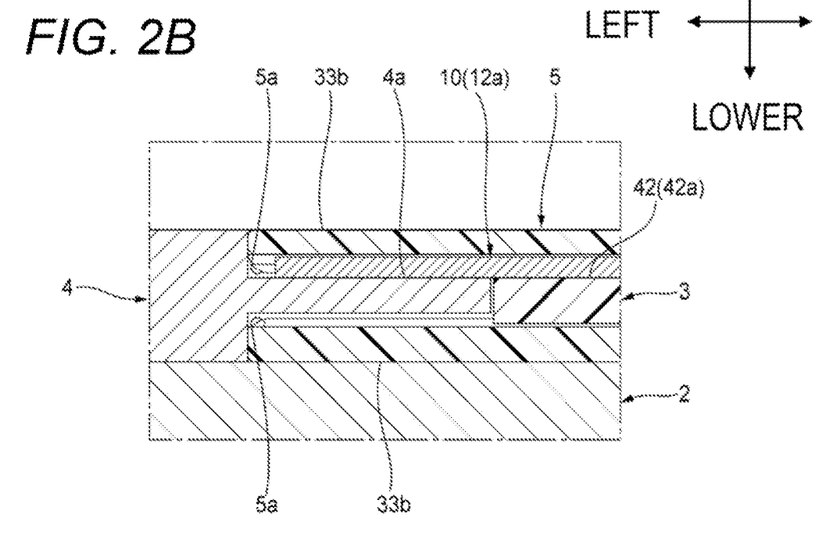
FIG. 2B is an enlarged view of a portion B of FIG. 2A.

Next, the flange portion 4b of the conductive plate 4 and the concave portion 6a of the opposite unit 6 are fitted to each other, so that the opposite unit 6 is connected to the left side of the conductive plate 4 to which the voltage detection unit 5 has been attached (see FIGS. 2A and 2B and the like). Thus, the assembly of the conductive module 3 is completed.

The conductive module 3 obtained in this manner is subjected to assembly of the power storage device 1 shown in FIG. 1. Specifically, the power storage device 1 is obtained by alternately stacking the power storage modules 2 and the conductive modules 3 in the upper-lower direction and fixing these stacked modules with a predetermined metal fitting or the like.

As described above, according to the voltage detection unit 5 of the present embodiment, the voltage detection terminal 10 having the distal end portion 12a to be electrically connected to the conductive plate 4, which is a detection target, is accommodated in the terminal accommodating concave 42 of the housing 40, and the cover 30 can be locked to the housing 40 in the state (temporary locking position) where the distal end portion 12a of the voltage detection terminal 10 is exposed. Therefore, when the voltage detection unit 5 is electrically connected to the conductive plate 4, for example, after the voltage detection unit 5 is attached to the conductive plate 4, the exposed distal end portion 12a of the voltage detection terminal 10 and the flange portion 4a of the conductive plate 4 can be fixed by using a technique such as the ultrasonic bonding or the welding. As a result, as compared with typical bolt fastening or the like, it is possible to eliminate a need for other components for connection, and as compared with the above-described connection method in the related art, it is possible to facilitate position alignment of the voltage detection terminal 10 and the conductive plate 4 and to reduce contact resistance at a contact point. Further, after the conductive plate 4 and the voltage detection terminal 10 are connected to each other, the cover 30 is moved from the temporary locking position to the final locking position, so that the distal end portion 12a of the voltage detection terminal 10 can be covered by the cover 30 to protect the distal end portion 12a. Accordingly, the voltage detection unit 5 according to the present embodiment is excellent in workability of the electrical connection with the conductive plate 4.

Further, in the voltage detection unit 5 according to the present embodiment, the locking portion 36 of the cover 30 can be respectively locked to the temporary locked portion 55 and the final locked portion 56 of the housing 40 at the front side in the front-rear direction, and the rear electric wire holding piece 35 on the rear side of the cover 30 can be inserted into the rear accommodating hole 53 on the rear side of the housing 40. When the cover 30 is locked to the housing 40 at the temporary locking position, the extended end portions of the electric wire holding pieces 35 are inserted into the accommodating holes 53. Here, the housing 40 includes the extending portion 400 at the rear of the housing 40, the extending portion 400 being formed by the upper wall of the accommodating hole 53 extending rightward in the left-right direction. That is, when the cover 30 is locked to the housing 40 at the temporary locking position, the extending portion 400 covers a part of an upper side of the electric wire holding piece 35 inserted into the accommodating hole 53. Therefore, in the voltage detection unit 5, a contact area between the electric wire holding piece 35 and the accommodating hole 53 or an area (so-called engagement margin) in which the electric wire holding piece 35 is covered by the accommodating hole 53 is increased as compared with a case where the housing does not have the extending portion. As a result, in the voltage detection unit 5 according to the present embodiment, displacement such as the cover 30 being detached from the housing 40 at the temporary locking position is more appropriately prevented, and work for electrically connecting the voltage detection unit 5 to the conductive plate 4 described above is further facilitated.

Further, according to the voltage detection unit 5 of the present embodiment, since the concave end portion 301 of the cover 30 has the shape corresponding to the extended end portion 401 of the housing 40 and the concave side surface 302 has the shape corresponding to the extended side surface 402 at the final locking position, the cover 30 can be attached to the housing 40 in an appropriate state. Further, in the voltage detection unit 5 according to the present embodiment, the extended side surface 402 of the extending portion 400 is inclined such that the width of the extending portion 400 in the front-rear direction increases from the extended end portion 401, which is on the right side, toward the left side in the left-right direction. For example, in a case where the extended side surface of the extending portion is not inclined (that is, the extended side surface extends substantially vertically with respect to the extended end portion along the attachment direction), when a dimensional deviation occurs in at least one of the cover and the housing, there is a likelihood that the cover cannot be attached to the housing in the appropriate state due to this dimensional deviation. As an example of a case in which the cover cannot be attached to the housing in the appropriate state, a large gap may be generated between the housing and the cover. However, in the voltage detection unit 5 according to the present embodiment, since the extended side surface 402 is inclined, the above-described deviation can be accommodated by the inclination of the extended side surface 402 as compared with the case where the extended side surface is not inclined. However, as another embodiment, as long as the cover 30 can be attached to the housing 40 in the appropriate state, the extended side surface 402 of the extending portion 400 may not be inclined.

In addition, according to the power storage device 1 of the present embodiment, since the plurality of conductive modules 3 each including the conductive plate 4 and the voltage detection unit 5 described above and the plurality of power storage modules 2 each capable of charging and discharging are alternately stacked in the upper-lower direction, the plurality of power storage modules 2 are electrically connected in series via the conductive modules 3. Therefore, when a large gap is formed between the housing and the cover locked at the final locking position in the voltage detection unit, the contact area between the voltage detection unit and the power storage module is reduced by the area of the gap. When the contact area described above is too small, loads of the stacked power storage module and the stacked conductive module generated in the voltage detection unit are not appropriately dispersed, which may lead to breakage or deformation of various components in the power storage device. However, since the power storage device 1 according to the present embodiment includes the voltage detection unit 5 having the above-described various effects, the contact area between the voltage detection unit 5 and the power storage module 2 is secured, and thus it is possible to prevent breakage or deformation of the various components as described above.

While the presently disclosed subject matter has been described with reference to certain exemplary embodiments thereof, the scope of the presently disclosed subject matter is not limited to the exemplary embodiments described above, and it will be understood by those skilled in the art that various changes and modifications may be made therein without departing from the scope of the presently disclosed subject matter as defined by the appended claims.

According to an aspect of the embodiments described above, a voltage detection unit (5) includes a voltage detection terminal (10) having a plate-shape and having a connection portion (for example, a distal end portion 12a) configured to be electrically connected to a detection target (for example, a conductive plate 4), a housing (40) having a plate shape and having an accommodating concave portion (for example, a terminal accommodating concave 42) configured to accommodate the voltage detection terminal (10) and a cover (30) configured to be attached to the housing (40) by being moved from a first side toward a second side along a first direction and to cover the accommodating concave portion (the terminal accommodating concave 42). The cover (30) is configured to be locked to the housing (40) at a temporary locking position at which the cover (30) covers only a part of the accommodating concave portion (the terminal accommodating concave 42) such that the connection portion (the distal end portion 12a) is exposed and at a final locking position at which the cover (30) covers an entirety of the accommodating concave portion. The cover (30) includes a main body portion configured to, when the cover (30) is at the final locking position, cover the accommodating concave portion and including a locking portion (36) provided on a third side in a second direction being perpendicular to the first direction and being a longitudinal direction of the voltage detection unit (5), and a locking piece (for example, an electric wire holding piece 35) provided on a fourth side opposite to the third side along the second direction and extending from the main body portion toward the second side along the first direction.

According to the voltage detection unit having the configuration described above, the voltage detection terminal having the connection portion electrically connected to the detection target is accommodated in the accommodating concave portion of the housing, and the cover can be locked to the housing in the state (temporary locking position) where the connection portion of the voltage detection terminal is exposed. Therefore, when the voltage detection unit is electrically connected to the detection target (for example, the conductive plate used for the stacked power storage device), the exposed connection portion of the voltage detection terminal can be fixed to the detection target by a technique such as the ultrasonic bonding or the welding, for example, after the voltage detection unit is attached to the detection target. As a result, as compared with typical bolt fastening or the like, it is possible to eliminate a need for other components for connection, and as compared with the above-described connection method in the related art, it is possible to facilitate position alignment of the voltage detection terminal and the conductive plate and to reduce contact resistance at a contact point. Further, after the detection target and the voltage detection terminal are connected to each other, the cover is moved from the temporary locking position to the final locking position, so that the connection portion of the voltage detection terminal can be covered by the cover to protect the connection portion. As described above, the voltage detection unit having the present configuration is excellent in workability of the electrical connection with the detection target.

Further, in the voltage detection unit having the present configuration, the locking portion of the cover can be locked to the locked portion of the housing on one side (third side) of the voltage detection unit in the extending direction (longitudinal direction of the voltage detection unit), and the locking piece of the cover can be inserted into the locking hole of the housing on the other side (fourth side). When the cover is locked to the housing at the temporary locking position, the distal ends of the locking pieces of the cover in the attachment direction are inserted into the locking holes of the housing. Here, the housing of the present configuration has, on the other side in the extending direction, an extending portion formed by a part of an edge of the locking hole extends toward a base end side (first side) in the attachment direction. That is, when the cover is locked to the housing at the temporary locking position, the extending portion covers a part of the locking piece inserted into the locking hole. Therefore, in the voltage detection unit, a contact area between the locking piece and the locking hole of the cover or an area (so-called engagement margin) in which the locking piece is covered by the locking hole is increased as compared with a case where the housing does not have the extending portion. As a result, in the voltage detection unit having the present configuration, displacement such as the cover being detached from the housing at the temporary locking position is more appropriately prevented, and work for electrically connecting the voltage detection unit to the detection target described above is further facilitated.

The extending portion (400) may include an end portion (401) being an end of the extending portion (400) on the first side and an extended side surface (402) defining another end of the extending portion (400) in the second direction. The extended side surface (402) may be inclined such that a width of the extending portion (400) in the second direction is larger on the second side than on the first side. The cover (30) may include a first portion and a second portion (for example, a concave end portion 301 and a concave side surface 302) configured to, when the cover (30) is at the final locking position, abut against the end portion (401) and the extended side surface (402), respectively. Each of the first and second portions (the concave end portion 301 and concave side surface 302) may have a shape corresponding to each of the end portion (401) and the extended side surface (402).

With this configuration, since the portions of the cover that abuts against the extended end portion (end portion) and the extended side surface of the housing at the final locking position has the shape corresponding to the extended end portion and the extended side surface, the cover can be attached to the housing in an appropriate state. Further, in the voltage detection unit having the present configuration, the extended side surface of the extending portion is inclined such that the width of the extending portion in the front-rear direction (second direction) increases from the extended end portion toward the attachment direction of the cover. For example, in a case where the extended side surface of the extending portion is not inclined (that is, the extended side surface extends from the extended end portion along the attachment direction), when a dimensional deviation occurs in at least one of the cover and the housing, there is a chance that the cover cannot be attached to the housing in the appropriate state due to this dimensional deviation. As an example of a case in which the cover cannot be attached to the housing in the appropriate state, a large gap may be generated between the housing and the cover. However, in the voltage detection unit having the present configuration, since the extended side surface is inclined, the above-described deviation can be accommodated by the inclination of the extended side surface as compared with the case where the extended side surface is not inclined. As described above, the voltage detection unit having the present configuration is excellent in workability of the electrical connection with the detection target.

A power storage device (1) may include the voltage detection unit (5).

With this configuration, since the power storage device includes the voltage detection unit that can achieve the above-described effects workability in the electrical connection with the detection target is excellent.

The power storage device (1) may include a plurality of conductive modules (3) each including the voltage detection unit (5) and the detection target (4) configured to be electrically connected to the voltage detection unit and a plurality of plate-shaped power storage modules (2) configured to charge and discharge. The plurality of conductive modules (3) and the plurality of power storage modules (2) may be alternately stacked in a plate thickness direction of the plurality of conductive modules (3) and the plurality of power storage modules (2).

With this configuration, since the plurality of conductive modules each including the detection target and the voltage detection unit described above and the plurality of power storage modules each capable of charging and discharging are alternately stacked in the plate thickness direction, the plurality of power storage modules are electrically connected in series via the conductive modules. For example, when a large gap is formed between the housing and the cover when the cover is at the final locking position in the voltage detection unit, the contact area between the voltage detection unit and the power storage module is reduced by the area of the gap. When the contact area described above is small, loads of the stacked power storage module and the stacked conductive module generated in the voltage detection unit are not appropriately dispersed, which may lead to breakage or deformation of various components in the power storage device. However, since the power storage device having the present configuration includes the voltage detection unit having the effects as described above, the contact area between the voltage detection unit and the power storage module is kept large enough, and thus it is possible to prevent breakage or deformation of the various components as described above.

What is claimed is:

1. A voltage detection unit comprising:
   a voltage detection terminal having a plate-shape and having a connection portion configured to be electrically connected to a detection target;
   a housing having a plate shape and having an accommodating concave portion configured to accommodate the voltage detection terminal; and
   a cover configured to be attached to the housing by being moved from a first side toward a second side along a first direction and to cover the accommodating concave portion,
   wherein the cover is configured to be locked to the housing at a temporary locking position at which the cover covers only a part of the accommodating concave portion such that the connection portion is exposed and at a final locking position at which the cover covers an entirety of the accommodating concave portion,
   wherein the cover includes: a main body portion configured to, when the cover is at the final locking position, cover the accommodating concave portion and including a locking portion provided on a third side in a second direction each being perpendicular to the first direction and being a longitudinal direction of the voltage detection unit; and a locking piece provided on a fourth side opposite to the third side along the second direction and extending from the main body portion toward the second side along the first direction,
   wherein the housing includes: a locked portion provided on the third side and configured to be locked to the locking portion; a locking hole provided on the fourth side and configured to accommodate the locking piece; and an extending portion formed by a part of an edge of the locking hole, the part extending toward the first side along the first direction, and
   wherein a distal end of the locking piece on the second side is accommodated in the locking hole when the cover is at the temporary locking position.

2. The voltage detection unit according to claim 1,
   wherein the extending portion includes an end portion being an end of the extending portion on the first side and an extended side surface defining another end of the extending portion in the second direction, wherein the extended side surface is inclined such that a width of the extending portion in the second direction is larger on the second side than on the first side, wherein the cover includes a first portion and a second portion configured to, when the cover is at the final locking position, abut against the end portion and the extended side surface, respectively, and wherein each of the first and second portions has a shape corresponding to each of the end portion and the extended side surface.

3. A power storage device comprising:

the voltage detection unit according to claim 1.

4. The power storage device according to claim 3, comprising:

a plurality of conductive modules each including the voltage detection unit and the detection target configured to be electrically connected to the voltage detection unit; and a plurality of plate-shaped power storage modules configured to charge and discharge, wherein the plurality of conductive modules and the plurality of power storage modules are alternately stacked in a plate thickness direction of the plurality of conductive modules and the plurality of power storage modules.

* * * * *

UNITED STATES PATENT AND TRADEMARK OFFICE
CERTIFICATE OF CORRECTION

PATENT NO. : 12,283,668 B2  
APPLICATION NO. : 17/731929  
DATED : April 22, 2025  
INVENTOR(S) : Satoshi Morioka et al.

Page 1 of 1

It is certified that error appears in the above-identified patent and that said Letters Patent is hereby corrected as shown below:

On the Title Page

Item (30) Foreign Application Priority Data should read:  
Apr 30,2021(JP).................................2021-078143

Signed and Sealed this  
Twenty-fourth Day of June, 2025

Coke Morgan Stewart  
*Acting Director of the United States Patent and Trademark Office*